United States Patent [19]

Yoshioka et al.

[11] Patent Number: 4,908,729
[45] Date of Patent: Mar. 13, 1990

[54] LIGHTNING ARRESTER MONITOR

[75] Inventors: Takeo Yoshioka; Masahiro Kobayashi; Tadao Minagawa; Katsu Ujita, all of Amagasaki, Japan

[73] Assignee: Mitsubishi Denki Kabushiki Kaisha, Tokyo, Japan

[21] Appl. No.: 284,397

[22] Filed: Dec. 14, 1988

[30] Foreign Application Priority Data

May 27, 1988 [JP] Japan ................................ 63-128282

[51] Int. Cl.$^4$ .............................................. H02H 9/04
[52] U.S. Cl. ................................... 361/118; 361/131; 324/537
[58] Field of Search ............... 261/117, 118, 120, 121, 261/131, 127; 224/537, 555

[56] References Cited

FOREIGN PATENT DOCUMENTS 61-203586 3/1985 Japan .

OTHER PUBLICATIONS

IEEE 82 SM 381-2; "Influence of Uniformity on Energy Absorption Capabilities of Zinc Oxide . . . "; A. Mizukoshi et al.
"New Sensor Handbook"; May 20, 1982.

Primary Examiner—Derek S. Jennings
Attorney, Agent, or Firm—Oblon, Spivak, McClelland, Maier & Neustadt

[57] ABSTRACT

A lightning arrester monitor which consists of an oxygen gas sensor provided in a lightning arrester having a zinc-oxide-type element made of zinc oxide, the main component thereof, and other oxides added thereto, the oxygen gas sensor measures the oxygen concentration of the element which increases as degradation thereof goes on. The monitor makes it possible to assess degradation of the zinc-oxide-type element with ease, without requiring any complicated electrical circuit for detecting leakage current.

8 Claims, 3 Drawing Sheets

LIGHTNING ARRESTER MONITOR

BACKGROUND OF THE INVENTION

1. Field of the Invention

This invention relates to a lightning arrester monitor which is used for assessing any degradation of a zinc-oxide-type element used in a lightning arrester.

2. Description of the Related Art

FIG. 1 schematically shows, by way of example, the construction of a conventional automatic lightning arrester monitor which is disclosed in Japanese Patent Laid-Open No. 61-203586. As shown in the drawing, an instrument box 3 which is grounded by means of a grounding cable 2 is provided for a lightning arrester 1 equipped with a zinc-oxide-type element. Arranged in this instrument box 3 are a current transformer 4 for measuring leakage current and a shielded cable 5 for transmitting a signal from this current transformer 4 to a signal processing circuit (not shown).

The operation of the above conventional lightning arrester monitor will now be described. A very small amount of leakage current normally flows through the grounding cable 2 of the lightning arrester 1. This leakage current exhibits a constant value except during the operation of the lightning arrester 1. By monitoring to see whether or not the leakage current exhibits a constant value, it can be ascertained whether or not the lightning arrester is in the normal condition. The current transformer 4, which is provided in the grounded instrument box 3 for the purpose of measuring leakage current, generates an electric signal, which is transmitted to a signal processing circuit (not shown) through the shielded cable 5. The monitoring of the lightning arrester 1 is conducted on the basis of any changes in this electric signal.

A problem in the above-described conventional lightning arrester monitor is that a complicated electric circuit providing high accuracy is needed for detecting leakage current.

SUMMARY OF THE INVENTION

This invention has been conceived for the purpose of overcoming the above problem. It is accordingly an object of this invention to provide a highly reliable lightning arrester monitor which makes it possible to measure any degradation in the zinc-oxide-type element of a lightning arrester with ease and is based upon a new concept that is completely different from the conventional one, which utilizes changes in leakage current.

In accordance with this invention, there is provided a lightning arrester monitoring device which comprises an oxygen gas sensor provided in a lightning arrester of the type having a zinc-oxide-type element made of zinc oxide as a main component and other oxides, the gas sensor measures the oxygen concentration in the lightning arrester which increases as degradation of the element goes on.

DESCRIPTION OF THE PREFERRED EMBODIMENT

Figure 2:
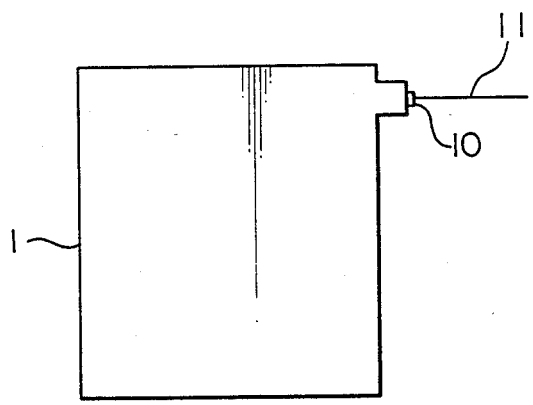
FIG. 2 is a schematic view showing the construction of a lightning arrester monitor in accordance with an embodiment of this invention.
Figure 3:
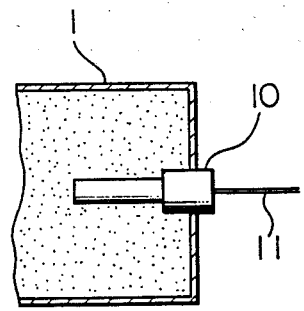
FIG. 3 is an enlarged view of the essential part of the monitor shown in FIG. 2.

Embodiments of this invention will now be described with reference to the attached drawings. FIG. 2 is a schematic view showing the construction of a lightning arrester monitor in accordance with an embodiment of this invention, and FIG. 3 is a schematic enlarged view of the oxygen gas sensor attached to the device shown in FIG. 2. In the drawings, identical or equivalent components are referred to by the same reference numerals. As shown in the drawings, provided for a lightning arrester 1 are an oxygen gas sensor 10 such as a zirconia-type oxygen gas sensor for measuring the oxygen concentration in the lightning arrester 1 and a shielded cable 11 connected to this oxygen gas sensor 10.

The zinc-oxide-type element in the lightning arrester 1 contains zinc oxide as its main component and other oxides added thereto, which are shown in the table below. The element is obtained by mixing these oxides together and baking the mixture.

| Oxide Components of the Zinc-Oxide-Type Element | |
| --- | --- |
| Components | Mol % |
| $Bi_2O_3$ | 0.5 |
| $Sb_2O_3$ | 1.0 |
| $Co_2O_3$ | 0.5 |
| $MnO_2$ | 0.5 |
| $Cr_2O_3$ | 0.5 |
| $SiO_2$ | 0.5 |

A study conducted by the inventors has revealed that a voltage is normally applied to the zinc-oxide-type element of the lightning arrester 1, and that any degradation of the element which increases leakage voltage under electric stress causes the oxygen in the oxide to be released.

It is consequently possible to assess any degradation of the zinc-oxide-type element by measuring the oxygen concentration in the lightning arrester 1 by means of the oxygen gas sensor 10.

Figure 4:
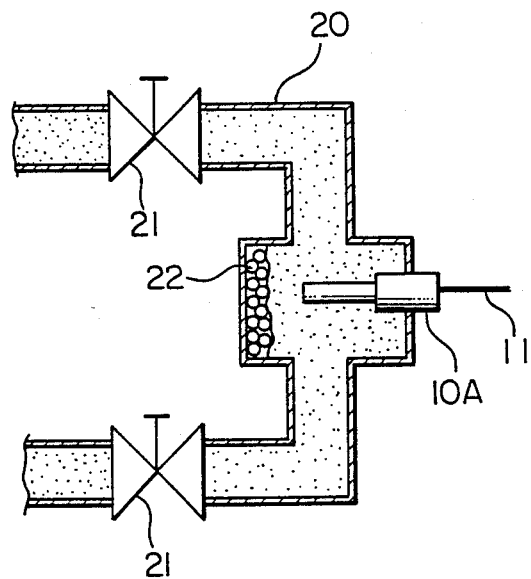
FIG. 4 is a schematic view showing the construction of a lightning arrester monitor in accordance with another embodiment of this invention.

FIG. 4 is a schematic view showing the construction of a lightning arrester monitor in accordance with another embodiment of this invention. In this embodiment, the oxygen gas sensor is arranged in a communication pipe 20, which is connected, for example, to an $SF_6$-gas-sealing-type lightning arrester (not shown) through the intermediary of shut-off valves 21 for preventing the influence of impurities such as water. Provided in the communicating pipe 20 is an oxygen gas sensor 10A such as a galvanic oxygen gas sensor, of which the front end section protrudes within the communicating pipe 20. An adsorbent 22 is disposed in the vicinity of this oxygen gas sensor 10A.

Figure 1:
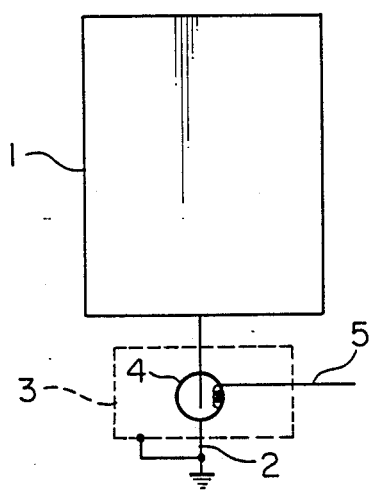
FIG. 1 is a schematic view showing the construction of a conventional lightning arrester monitor.
Figure 5:
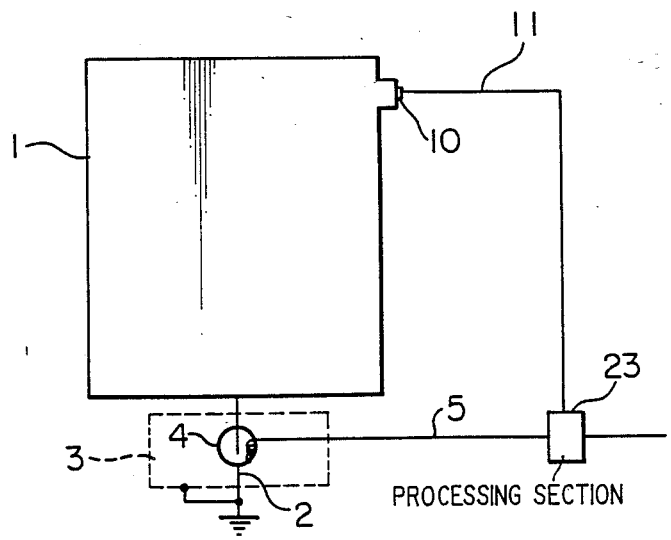
FIG. 5 is a schematic view showing the construction of a lightning arrester monitor in accordance with still another embodiment of this invention.

FIG. 5 is a schematic view showing the construction of a lightning arrester monitor in accordance with still another embodiment of this invention. This embodiment consists of a combination of the lightning arrester monitor shown in FIG. 2 and the conventional monitor shown in FIG. 1. Provided at the other end of the shielded cable 11 is a signal processing section 23 for processing the electric signal from the cable 11 and that from the current transformer 4 provided in the instrument box 3, the latter signal indicating leakage current through the shielded cable 5.

In an atmosphere whose main component is nitrogen or nitrogen and oxygen, a titania-type oxygen gas sensor for example, may employed as the oxygen gas sensor.

What is claimed is:

1. A lightning arrester monitoring device, comprising an oxygen gas sensor provided in a lightning arrester of the type having a zinc-oxide-type element made of zinc oxide as a main component and other oxides, said gas sensor measures the oxygen concentration in the lightning arrester which increases as degradation of said element goes on.

2. A device as claimed in claim 1, wherein said oxygen gas sensor is a zirconia-type oxygen gas sensor.

3. A device as claimed in claim 1, wherein said oxygen gas sensor is a titania-type oxygen gas sensor.

4. A device as claimed in claim 1, wherein said oxygen gas sensor is a galvanic oxygen gas sensor.

5. A device as claimed in claim 1, wherein said oxygen gas sensor is provided in a communicating pipe which communicates with the lightning arrester, the front end section of said oxygen gas sensor protruding within said communicating pipe.

6. A device as claimed in claim 5, wherein an adsorbent agent is provided in said communicating pipe at a position in the vicinity of said oxygen gas sensor.

7. A device as claimed in claim 1 wherein the lightning arrester is equipped with a current transformer for measuring the leakage current flowing through the grounding cable thereof and a shield cable for transmitting an electric signal from said current transformer to a signal processing section.

8. A device as claimed in claim 1, wherein the lightning arrester is an $SF_6$-gas-sealing-type lightning arrester having a zinc-oxide-type element.

* * * * *